(12) United States Patent
Cheng et al.

(10) Patent No.: US 9,730,208 B2
(45) Date of Patent: Aug. 8, 2017

(54) LOAD POWER CONSUMPTION MANAGEMENT IN DISCONTINUOUS RECEPTION

(71) Applicant: Telefonaktiebolaget L M Ericsson (publ), Stockholm (SE)

(72) Inventors: Jung-Fu Cheng, Fremont, CA (US); Sorour Falahati, Stockholm (SE); Havish Koorapaty, Saratoga, CA (US); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 14/778,505

(22) PCT Filed: Aug. 5, 2015

(86) PCT No.: PCT/SE2015/050847
§ 371 (c)(1),
(2) Date: Sep. 18, 2015

(87) PCT Pub. No.: WO2016/022059
PCT Pub. Date: Feb. 11, 2016

(65) Prior Publication Data
US 2016/0295555 A1   Oct. 6, 2016

Related U.S. Application Data

(60) Provisional application No. 62/034,532, filed on Aug. 7, 2015.

(51) Int. Cl.
*H04W 4/00* (2009.01)
*H04W 72/04* (2009.01)
(Continued)

(52) U.S. Cl.
CPC ......... *H04W 72/042* (2013.01); *H04W 48/16* (2013.01); *H04W 52/0216* (2013.01);
(Continued)

(58) Field of Classification Search
CPC ............. H04W 72/042; H04W 76/048; H04W 52/0219; H04W 72/121; H04W 48/16
(Continued)

(56) References Cited

U.S. PATENT DOCUMENTS

| 2009/0175186 A1 | 7/2009 | Du et al. |
| 2010/0215011 A1* | 8/2010 | Pan ....................... H04L 5/0064 370/329 |

(Continued)

FOREIGN PATENT DOCUMENTS

| EP | 2621242 A1 | 7/2013 |
| WO | 2014109769 A1 | 7/2014 |

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.3.0, Jun. 1, 2013, pp. 1-108, 3GPP, France.

(Continued)

*Primary Examiner* — Sai-Ming Chan
(74) *Attorney, Agent, or Firm* — Coats & Bennett, PLLC

(57) ABSTRACT

According to one aspect of the present disclosure, a method is implemented by a particular user equipment (UE) that is part of a group of UEs. The particular UE receives physical layer group signaling sent from a base station over a control channel on a first carrier. The particular UE determines, based on the group signaling, whether data will be transmitted by the base station to a UE in the group during a current DRX cycle over a second carrier that is different
(Continued)

from the first carrier. Depending on the outcome of the determining, the particular UE performs one of the following: entering a DRX sleep mode for the rest of the DRX cycle; and starting or restarting a DRX inactivity timer of the particular UE and monitoring the control channel until the DRX inactivity timer expires.

20 Claims, 13 Drawing Sheets

(51) Int. Cl.
  *H04W 76/04* (2009.01)
  *H04W 72/12* (2009.01)
  *H04W 52/02* (2009.01)
  *H04W 48/16* (2009.01)
(52) U.S. Cl.
  CPC ... *H04W 52/0219* (2013.01); *H04W 52/0229* (2013.01); *H04W 72/121* (2013.01); *H04W 76/048* (2013.01); *H04W 72/1289* (2013.01); *Y02B 60/50* (2013.01)
(58) Field of Classification Search
  USPC .......................................................... 370/329
  See application file for complete search history.

(56) References Cited

U.S. PATENT DOCUMENTS

| | | | |
|---|---|---|---|
| 2011/0267957 A1* | 11/2011 | Du | H04L 5/0007 370/241 |
| 2011/0294491 A1 | 12/2011 | Fong et al. | |
| 2012/0275364 A1 | 11/2012 | Anderson et al. | |
| 2013/0163497 A1 | 6/2013 | Wei | |
| 2015/0085841 A1* | 3/2015 | Sadek | H04W 72/1215 370/336 |

OTHER PUBLICATIONS

3rd Generation Partnership Project, 3rd Generation Partnership Project; Technical Specification Group Radio Access Network; Evolved Universal Terrestrial Radio Access (E-UTRA); Physical layer procedures (Release 11). Technical Specification, 3GPP TS 36.213 V11.3.0, Jun. 1, 2013, pp. 1-344, 3GPP, France.

3rd Generation Partnership Project, 3rd Generation Partnership Project; Technical Specification Group. Radio Access Network; Evolved Universal Terrestrial Radio Access (E-UTRA); Radio Resource Control (RRC); Protocol specification (Release 11). Technical Specification, 3GPP TS 36.331 V11.3.0, Mar. 1, 2013, pp. 1-344, 3GPP, France.

3rd Generation Partnership Project, "3rd Generation Partnership Project; Technical Specification Group. Radio Access Network; Evolved Universal Terrestrial Radio Access (E-UTRA); Medium Access Control (MAC) protocol specification (Release 11)", Technical Specification, 3GPP TS 36.321 V11.3.0, Jun. 1, 2013, pp. 1-57, 3GPP, France.

NTT DOCOMO, Inc. "Inactivity timer disablement"; 3GPP TSG RAN WG2 #60bis; Tdoc-R2-080432; Seville, Spain; Jan. 14-18, 2008; pp. 1-2.

* cited by examiner

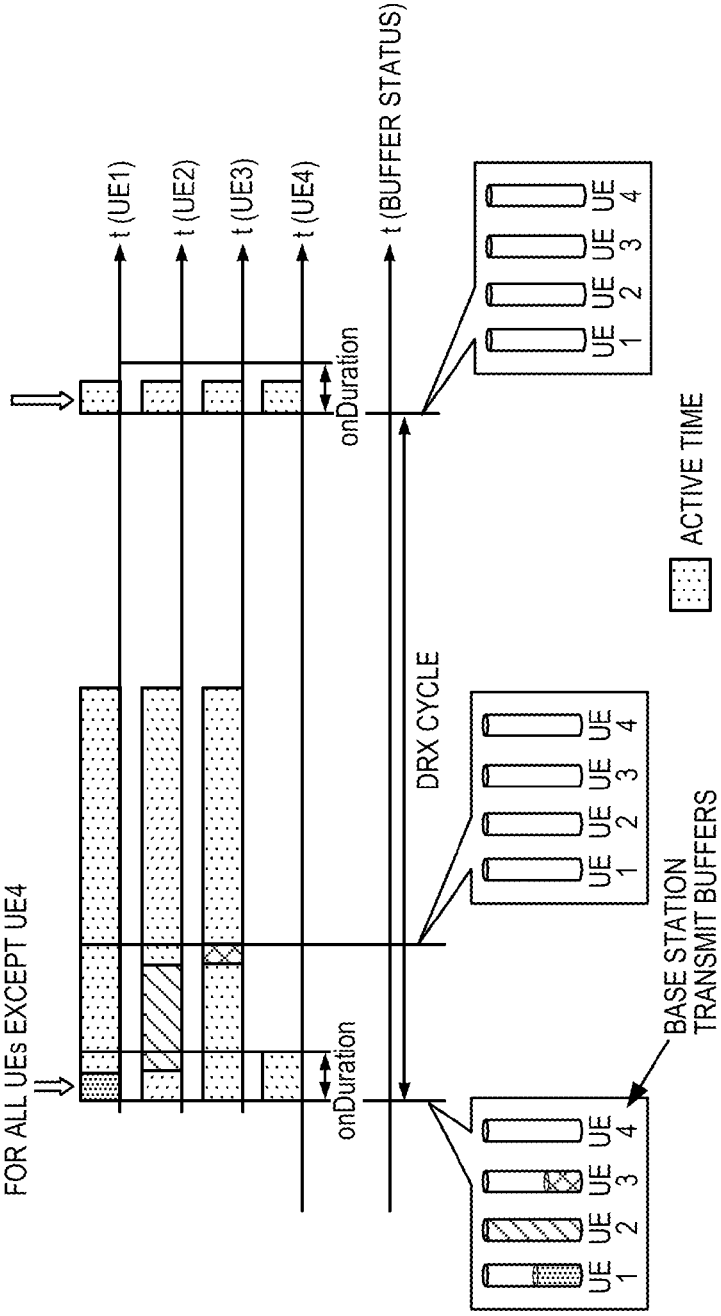

LOAD POWER CONSUMPTION MANAGEMENT IN DISCONTINUOUS RECEPTION

RELATED APPLICATIONS

This application claims the benefit of U.S. Provisional Application No. 62/034,532, filed Aug. 7, 2014, the disclosure of which is incorporated herein by reference in its entirety.

TECHNICAL FIELD

The present disclosure relates to discontinuous reception (DRX), and in particular to methods and apparatus for managing DRX.

BACKGROUND

Long Term Evolution (LTE) networks use Orthogonal Frequency-Division Multiplexing (OFDM) in the downlink and DFT-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 ms, each radio frame consisting of ten equally-sized subframes of length Tsubframe=1 ms. For a normal cyclic prefix, one subframe consists of 14 OFDM symbols. The duration of each OFDM symbol is approximately 71.4 s.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Rel-11 onwards, resource assignments can be scheduled on the enhanced Physical Downlink Control Channel (EPDCCH). For Rel-8 to Rel-10 only the Physical Downlink Control Channel (PDCCH) is available.

The reference symbols shown in FIG. 3 are the cell specific reference symbols (CRS) and are used to support multiple functions including fine time and frequency synchronization and channel estimation for certain transmission modes.

In a cellular communication system there is a need to measure the channel conditions in order to know what transmission parameters to use. These parameters include, e.g., modulation type, coding rate, transmission rank, and frequency allocation. This applies to uplink (UL) as well as downlink (DL) transmissions.

The scheduler that makes the decisions on the transmission parameters is typically located in the base station (eNB). Hence, it can measure channel properties of the UL directly using known reference signals that the terminals (user equipment or "UEs") transmit. These measurements then form a basis for the UL scheduling decisions that the eNB makes, which are then sent to the UEs via a downlink control channel.

However, for the DL the eNB is unable to measure any channel parameters. Rather, it must rely on information that the UEs can gather and subsequently send back to the eNB. This so-called Channel-State Information (CSI) is obtained in the UEs by measuring on known reference symbols, Channel-State Information Reference Symbols (CSI-RS), transmitted in the DL. See the 3GPP specification 36.211, which pertains to LTE specifically.

The CSI-RS are UE specifically configured by radio resource signaling (RRC), with a certain configured periodicity, $T=\{5,10,20,40,80\}$ ms (i.e., every $T^{th}$ subframe). There is a possibility to configure both non-zero power (NZP) CSI-RS and zero power (ZP) CSI-RS, where the ZP CSI-RS is simply an unused resource that can be matched to a NZP CSI-RS in an adjacent eNB. This will improve the SINR for the CSI-RS measurements for a UE served by the adjacent cell. The ZP CSI-RS can also be used as CSI-IM as introduced in Rel.11 and explained below.

In LTE, the format of the CSI reports are specified in detail and may contain CQI (Channel-Quality Information), a Rank Indicator (RI), and a Precoding Matrix Indicator. See 3GPP Specification 36.213. The CSI reports can be wideband or applicable to subbands. They can be configured by a radio resource control (RRC) message to be sent periodically or in an aperiodic manner, triggered by a control message from the eNB to a UE. The quality and reliability of the CSI are crucial for the eNB in order to make the best possible scheduling decisions for upcoming DL transmissions.

The LTE standard does not specify in detail how the UE should obtain and average these measurements from multiple time instants. For example, the UE may measure over a time frame unknown to the eNB and combine several measurements in a UE-proprietary way to create the CSI-values that are reported, either periodically or triggered.

In the context of LTE, the available CSI-RS are referred to as "CSI-RS resources". In addition, there are also "CSI-IM resources", where IM stands for "Interference Measurement". The latter are defined from the same set of possible physical locations in the time/frequency grid as the CSI-RS, but with zero power, hence "ZP CSI-RS." In other words, they are "silent" CSI-RS and when the eNB is transmitting the shared data channel, it avoids mapping data to those resource elements used for CSI-IM. These are intended to give a UE the possibility to measure the power of any interference from another transmitter than its serving node.

Each UE can be configured with one, three, or four different CSI processes. Each CSI process is associated with one CSI-RS and one CSI-IM where these CSI-RS resources have been configured to the UE by RRC signaling and are thus periodically transmitted/occurring with a periodicity of T and with a given subframe offset relative to the frame start.

If only one CSI process is used, then it is common to let the CSI-IM reflect the interference from transmission in all other eNBs except the eNB serving the UE, i.e., the serving cell uses a ZP CSI-RS that overlaps with the CSI-IM configured to the UE, but in other adjacent eNBs, there is no ZP CSI-RS on these resource elements. In this way, the UE will measure the interference from adjacent cells when measuring the received power in the resource elements configured as CSI-IM.

If additional CSI processes are configured to the UE, then there is a possibility for the network to also configure a ZP CSI-RS in the adjacent eNB that overlaps with a CSI-IM for this CSI process for the UE in the serving eNB. In this way the UE will send accurate CSI feedback also for the case when this adjacent cell is not transmitting. Hence, CSI feedback to support coordinated scheduling between eNBs is enabled with the use of multiple CSI processes where a first CSI process can be configured to the UE to feed back CSI for the full interference case and a second CSI process feeds back CSI for the case when a (preferably a strong interfering) adjacent cell is muted. Hence, the eNB receives CSI feedback for two possible transmission hypotheses and will then use this in the coordinated scheduler. As mentioned above, up to four CSI processes can be configured to the UE, thereby enabling feedback of four different transmission hypotheses.

Physical Downlink Control Channel (PDCCH) and Enhanced PDCCH (EPDCCH)

The PDCCH/EPDCCH is used to carry downlink control information (DCI) such as scheduling decisions and power-control commands. More specifically, the DCI includes:

- Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.
- Uplink scheduling grants, including PUSCH resource indication, transport format, and hybrid-ARQ-related information. An uplink scheduling grant also includes a command for power control of the PUSCH.
- Power-control commands for a set of terminals as a complement to the commands included in the scheduling assignments/grants.

One PDCCH/EPDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each subframe in each cell. Furthermore, to support different radio-channel conditions, link adaptation can be used, where the code rate of the PDCCH/EPDCCH is selected by adapting the resource usage for the PDCCH/EPDCCH, to match the radio-channel conditions.

Carrier Aggregation

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e., that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CCs, where the CCs have, or at least the possibility to have, the same structure as a Rel-8 carrier. CA is illustrated in FIG. 4.

The number of aggregated CCs as well as the bandwidth of the individual CCs may be different for uplink and downlink. A symmetric configuration refers to the case where the number of CCs in the downlink and uplink is the same, whereas an asymmetric configuration refers to the case that the number of CCs is different. It is important to note that the number of CCs configured in a cell may be different from the number of CCs seen by a terminal. A terminal may for example support more downlink CCs than uplink CCs, even though the cell is configured with the same number of uplink and downlink CCs.

Cross-Carrier Scheduling

Scheduling of a CC is done on the PDCCH or EPDCCH via downlink assignments. Control information on the PDCCH/EPDCCH is formatted as a Downlink Control Information (DCI) message. In Rel-8 a terminal only operates with one DL and one UL CC. The association between DL assignment, UL grants, and the corresponding DL and UL CCs is therefore clear. In Rel-10 two modes of CA needs to be distinguished. The first case is very similar to the operation of multiple Rel-8 terminals, a DL assignment or UL grant contained in a DCI message transmitted on a CC is either valid for the DL CC itself or for an associated (either via cell-specific or UE specific linking) UL CC. A second mode of operation augments a DCI message with the Carrier Indicator Field (CIF). A DCI containing a DL assignment with CIF is valid for that DL CC indicated with CIF, and a DCI containing an UL grant with CIF is valid for the indicated UL CC. The DCI transmitted using EPDCCH which was introduced in Rel-11 can also carry CIF, which means that cross carrier scheduling is supported also when using EPDCCH.

Licensed Assisted Access (LAA) to Unlicensed Spectrum Using LTE

Up to now, the spectrum used by LTE is dedicated to LTE. This has the advantage that LTE systems do not need to care about the coexistence issue, and the spectrum efficiency can be maximized. However, the spectrum allocated to LTE is limited, which cannot meet the ever increasing demand for larger throughput from applications/services. Therefore, discussions are ongoing in 3GPP to initiate a new study item on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects that a channel is occupied.

Furthermore, one way to utilize the unlicensed spectrum reliably is to transmit essential control signals and channels on a licensed carrier. That is, as shown in FIG. 5, a UE is connected to a PCell in the licensed band and one or more SCells in the unlicensed band. In this application we denote a secondary cell in unlicensed spectrum as a "license assisted secondary cell" (LA SCell).

Small Cells ON/OFF

One of the mechanisms for interference avoidance and coordination among small cells is the small cell on/off feature. According to this feature the small cell may be turned on and off where the "on" and "off" period may depend on the criteria or application. Another purpose of small cell on/off can be for energy saving.

Discovery Signals

In LTE Rel-12, for small cell on/off where the eNB can be off for long periods of time, in order to assist the UE with the measurements, a discovery signal might be needed. The discovery signal needs to support the properties required for enabling RRM measurements, RLM related procedures, and coarse time/frequency synchronization. In order to make UE measurements possible, the eNB has to wake up periodically (e.g., once every 80 ms, or 160 ms, etc.) and send the discovery signal so that it can be used by the UE for mobility related operations such as cell identification, RLM, and measurement.

Within one cell, there may be multiple transmission points, from which the downlink signal can transmitted. Examples of this are a distributed antenna system, where multiple radio remote heads that are physically dislocated within the cell, transmit signals that all belong to the same cell (i.e., same CellID). The term transmission point may also refer to a sector of a site where the different sectors of the same site then constitute different transmission points. The discovery signal should also be capable of identifying individual transmission points and enabling RRM measurements for them.

In 3GPP, it has been agreed that the discovery signals will contain the PSS, SSS, and the CRS. The CSI-RS may optionally be present when configured. The discovery signal can be transmitted at least with the periodicities of 40, 80, and 160 ms. The duration of the discovery signal will be 5 subframes or less.

The discovery signal parameters will be communicated to the UE by the network node in order to enable the UE to make measurements. These parameters may include, e.g., a duration of each occasion when the discovery signal is transmitted (referred to as the DRS occasion), a periodicity of the occurrence of the occasion of discovery signals, a timing (in terms of a start time or an offset from a reference point such as a particular frame and subframe number) of the discovery signal occasions. In addition to the timing, periodicity and duration of the DRS occasion, the discovery measurement timing configuration (DMTC) may also be signaled to the UE which tells the UE which subframes should be used to make measurements on the discovery signal. The signaling of the DMTC is currently being discussed in 3GPP.

DRX (Discontinuous Reception)

DRX is a RRC configured mechanism which enables the UE to save power during a cycle, referred to as the DRX cycle. When the UE is in DRX, it can sleep by relaxing its receiver for the remaining portion of the DRX cycle. The time that the UE is not in DRX can be considered as the "Active Time." In the following, some important aspects of the DRX mechanism are described.

When a UE is configured with a (long) DRX cycle, it monitors the downlink control channel in some configured subframes during a DRX cycle referred to as the "onDuration," where if the UE fails to decode any DL transmission, it goes to DRX. In case the UE decodes DL transmission, it comes out of DRX by starting a timer, referred to as the "drx-InactivityTimer" and continues monitoring the downlink control channel until the timer is expired. This timer starts or restarts with decoding any new DL assignment. When the drx-InactivityTimer expires the UE returns to DRX and sleeps until the next onDuration of the DRX cycle. Additionally, the DL and UL HARQ retransmissions occur as usual irrespective of the DRX cycle.

Moreover, two types of DRX cycles are introduced in the standards namely as the long and short DRX cycles, where the long cycle should be a multiple integer of the short cycle. A UE configured with the long DRX cycle can be also configured with a short DRX cycle. Such a UE, when coming out of long DRX, uses the short DRX cycle for a configured number of cycles and can fall back again to the long DRX cycle. An example of this is shown in FIG. 6, which is an example illustration of DRX timing event for a UE configured with both long and short DRX cycles only considering the DL control and data shared channel without the impact of the HARQ retransmissions, in which the variables "N" and "n" refer to the radio frame index and subframe index, respectively.

Assume that a UE is configured with DRX for the purpose of power saving. When the UE comes out of DRX, it monitors the (E)PDCCH during the Active Time where timers such as the onDuration Timer or the drx-InactivityTimer are started or restarted. The onDuration Timer starts or restarts as soon as the UE comes out of DRX and the drx-InactivityTimer starts or restarts as soon as the UE decodes an (E)PDCCH.

A possible problem can occur in relation to UE behavior during the DRX procedure when DRX is operated alongside other procedures which rely on signaling to a group of UEs. The signaling to a group of UEs could be, for example, a physical layer signal which uses a particular DCI format. The physical layer signal or a physical layer signal to a group of UEs is transmitted from an eNB and contains some common information being shared among the UEs within the group. In general, the physical layer group signaling can be transmitted from cell X for the cell Y, i.e., the physical layer group signaling conveys information which corresponds to the UEs served by cell Y. The cells X and Y can be different (e.g., the physical layer group signaling can be transmitted from a PCell but for an SCell), or the cells X and Y can be the same (e.g., the physical layer signal can be transmitted from an SCell and be applicable to UEs in the same SCell). In the following, cell Y is referred to as the serving cell.

When group signaling occurs during the onDuration, and is decoded by the intended UEs, it forces all those UEs to remain active during their corresponding Active Time. However, the data traffic situation may differ for these UEs within the group. For example some of the UEs which have been forced to wake up due to the group signaling may not have any ongoing traffic but they have to continue monitoring the presence of scheduling assignments until their corresponding timer expires. This behavior results in an unnecessary increase in UE power consumption. This impact is further increased for such UEs if the short DRX cycle is configured because the UE has to go through the short DRX cycles until it can commence the long DRX cycle which means additionally increased power consumption due to more monitoring occasions in short DRX cycles.

SUMMARY

The problem of degradation in system throughput due to overloading of the control and shared data channels at high load scenarios when UEs comes out of DRX can be solved by a method in which physical layer group signaling is obtained that includes some common information to a group of UEs about the signal transmission from the eNB. The signaling can additionally contain some information for each UE such that different UEs can be differentiated regarding their corresponding ongoing traffic and consequently behave differently in DRX procedure.

According to one aspect of the present disclosure, a method is implemented by a particular user equipment (UE) that is part of a group of UEs. The particular UE receives physical layer group signaling sent from a base station over a control channel on a first carrier. The particular UE determines, based on the group signaling, whether data will be transmitted by the base station to a UE in the group during a current DRX cycle over a second carrier that is different from the first carrier. Depending on the outcome of the determining, the particular UE performs one of the following: entering a DRX sleep mode for the rest of the DRX cycle; and starting or restarting a DRX inactivity timer of the particular UE and monitoring the control channel until the DRX inactivity timer expires.

According to another aspect of the present disclosure, a particular user equipment (UE) is disclosed that is configured to be part of a group of UEs. The particular UE includes a receiver circuit configured to receive physical layer group signaling sent from a base station over a control channel on a first carrier. The particular UE also includes one or more processing circuits configured to determine, based on the group signaling, whether data will be transmitted by the base station to a UE in the group during a current DRX cycle over a second carrier that is different from the first carrier. The one or more processing circuits are further configured to perform one of the following depending on the outcome of the determining: enter a DRX sleep mode for the rest of the DRX cycle; and start or restart a DRX inactivity timer of the particular UE and monitor the control channel until the DRX inactivity timer expires.

According to one aspect of the present disclosure, a method is implemented by a UE that is part of a group of UEs, each of which is configured to use DRX. The UE receives physical layer group signaling from a base station, with the group signaling being sent from the base station to the group of UEs over a control channel. The UE determines, based on the group signaling, whether data will be transmitted by the base station to one or more UEs in the group during a current DRX cycle. If the determining indicates that no data will be transmitted to any UE in the group during the current DRX cycle, the UE enters a DRX mode for the rest of the DRX cycle. If the determining indicates that data will be transmitted to any UE in the group during the current DRX cycle, the UE starts or restarts a DRX inactivity timer and monitors the control channel until the DRX inactivity timer expires.

According to a complementary aspect of the present disclosure, a UE is disclosed which is configured to be part of a group of UEs that use DRX. The UE includes a receiver circuit configured to receive physical layer group signaling from a base station, with the group signaling being sent from the base station to the group of UEs over a control channel. The UE also includes one or more processing circuits configured to determine, based on the group signaling, whether data will be transmitted by the base station to any UE in the group during a current DRX cycle. The one or more processing circuits are further configured to, if the determining indicates that no data will be transmitted to any UE in the group during the current DRX cycle, cause the UE to enter a DRX mode for the rest of the DRX cycle. The one or more processing circuits are further configured to, if the determining indicates that data will be transmitted to one or more UEs in the group during the current DRX cycle, start or restart a DRX inactivity timer and monitor the control channel via the receiver circuit until the DRX inactivity timer expires.

According to one aspect of the present disclosure, a method is implemented by a UE that is part of a group of UEs, each of which is configured to use DRX. The UE receives physical layer group signaling from a base station, with the group signaling being sent from the base station to the group of UEs over a control channel. The UE determines, based on the group signaling, whether data will be transmitted by the base station to the UE during a current DRX cycle. If the determining indicates that no data will be transmitted to the UE during the current DRX cycle, the UE enters a DRX mode for the rest of the DRX cycle. If the determining indicates that data will be transmitted to the UE during the current DRX cycle, the UE starts or restarts a DRX inactivity timer and monitors the control channel until the DRX inactivity timer expires.

According to a complementary aspect of the present disclosure, a UE is disclosed that is configured to be part of a group of UEs that use DRX. The UE includes a receiver circuit configured to receive physical layer group signaling from a base station, with the group signaling being sent from the base station to the group of UEs over a control channel. The UE also includes one or more processing circuits configured to determine, based on the group signaling, whether data will be transmitted by the base station to the UE during a current DRX cycle. The one or more processing circuits are further configured to, if the determining indicates that no data will be transmitted to the UE during the current DRX cycle, cause the UE to enter a DRX mode for the rest of the DRX cycle. The one or more processing circuits are further configured to, if the determining indicates that data will be transmitted to the UE during the current DRX cycle, start or restart a DRX inactivity timer and monitor the control channel via the receiver circuit until the DRX inactivity timer expires.

According to one aspect of the present disclosure, a method is disclosed which is implemented by a UE that is part of a group of UEs, each of which is configured to use DRX. The UE attempts to decode physical layer group signaling from a base station, with the group signaling being sent from the base station to the group of UEs over a control channel during a DRX cycle. If the group signaling cannot be decoded, the UE enters a DRX mode for the rest of the DRX cycle. If the group signaling is successfully decoded, the UE starts or restarts a DRX inactivity timer and monitors the control channel until the DRX inactivity timer expires.

According to a complementary aspect of the present disclosure, a UE is disclosed which is configured to be part of a group of UEs that use DRX. The UE includes a receiver circuit and one or more processing circuits. The one or more processing circuits are configured to attempt to decode physical layer group signaling from a base station, with the group signaling being sent from the base station to the group of UEs over a control channel during a DRX cycle. The one or more processing circuits are further configured to, if the group signaling cannot be decoded, cause the UE to enter a DRX mode for the rest of the DRX cycle. The one or more processing circuits are further configured to, if the group signaling is successfully decoded, start or restart a DRX inactivity timer and monitor the control channel via the receiver circuit until the DRX inactivity timer expires.

According to one aspect of the present disclosure, a method is disclosed which is implemented by a UE that is part of a group of UEs, each of which is configured to use DRX. The UE attempts to decode physical layer group signaling from a base station, with the group signaling being sent by the base station to the group of UEs over a control channel during a DRX cycle. If the group signaling cannot be decoded, the UE enters a DRX mode for the rest of the DRX cycle. If the group signaling is successfully decoded and indicates that no data will be transmitted to the UE during the current DRX cycle, the UE enters the DRX mode for the rest of the DRX cycle. If the group signaling is successfully decoded and indicates that data will be transmitted to the UE during the current DRX cycle, the UE starts or restarts a DRX inactivity timer and monitors the control channel until the DRX inactivity timer expires.

According to a complementary aspect of the present disclosure, a UE is disclosed which is configured to be part of a group of UEs that use DRX. The UE includes a receiver circuit and one or more processing circuits. The one or more processing circuits are configured to attempt to decode physical layer group signaling from a base station, with the group signaling being sent by the base station to the group of UEs over a control channel during a DRX cycle. The one or more processing circuits are further configured to, if the group signaling cannot be decoded, cause the UE to enter a DRX mode for the rest of the DRX cycle. The one or more processing circuits are further configured to, if the group signaling is successfully decoded and indicates that no data will be transmitted to the UE during the current DRX cycle, cause the UE to enter the DRX mode for the rest of the DRX cycle. The one or more processing circuits are further configured to, if the group signaling is successfully decoded and indicates that data will be transmitted to the UE during the current DRX cycle, start or restart a DRX inactivity timer and monitor the control channel via the receiver circuit until the DRX inactivity timer expires.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 8A-B are example illustrations of the impact of an optimized group signaling method in relation to a DRX procedure.

DETAILED DESCRIPTION

Terminologies

The following commonly terminologies are used in the embodiments and are elaborated below:
Network node: In some embodiments a more general term "network node" is used and it can correspond to any type of radio network node or any network node, which communicates with a UE and/or with another network node. Examples of network nodes are Node B, base station (BS), multi-standard radio (MSR) radio node such as MSR BS, eNodeB (eNB), network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g., MSC, MME etc.), O&M, OSS, SON, positioning node (e.g., E-SMLC), MDT, etc.
User equipment: In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, tablet, mobile terminals, smart phone, laptop embedded equipped (LEE), laptop mounted equipment (LME), USB dongles, etc.

Note that although terminology from 3GPP LTE has been used to describe the present disclosure, this should not be seen as limiting the scope of the present disclosure to only the aforementioned system. Other wireless systems, including WCDMA, HSPA, WiMax, WiFi, WLAN, and GSM/GERAN, may also benefit from exploiting the ideas covered within this disclosure.

The embodiments are described with main emphasis on single carrier operation of the UE. However the embodiments are applicable for multi-carrier or carrier aggregation operation of the UE. Therefore the embodiment methods of signaling information to the UE or to the other network nodes can be carried out independently for each cell on each carrier frequency supported by the network node.

In this section, the present disclosure will be illustrated in more detail by a number of example embodiments. It should be noted that these embodiments are not mutually exclusive. Components from one embodiment may be tacitly assumed to be present in another embodiment and it will be obvious to a person skilled in the art how those components may be used in the other example embodiments. The main embodiments covered by the present disclosure are methods in the network and UEs for optimized physical layer group signaling in relation to DRX.

Figure 1:
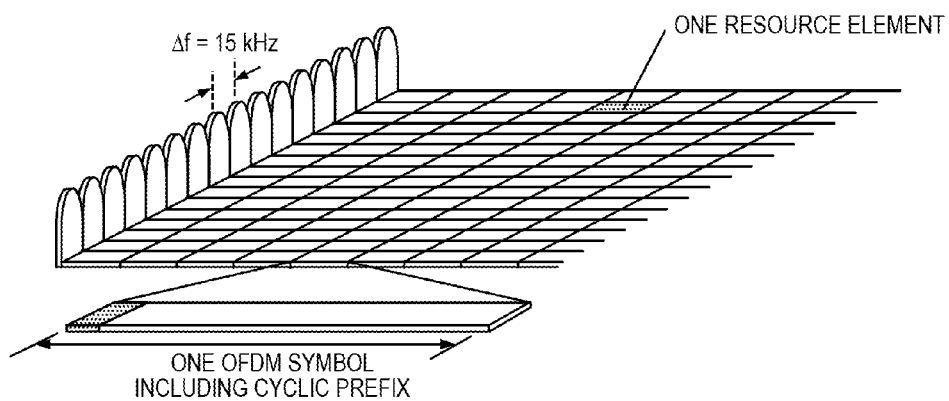
FIG. 1 illustrates a Long Term Evolution (LTE) downlink physical resource.
Figure 2:
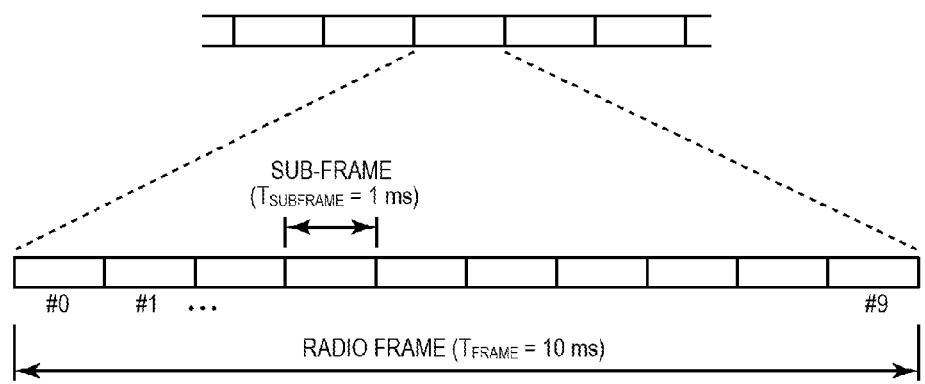
FIG. 2 illustrates an LTE time-domain structure.
Figure 3:
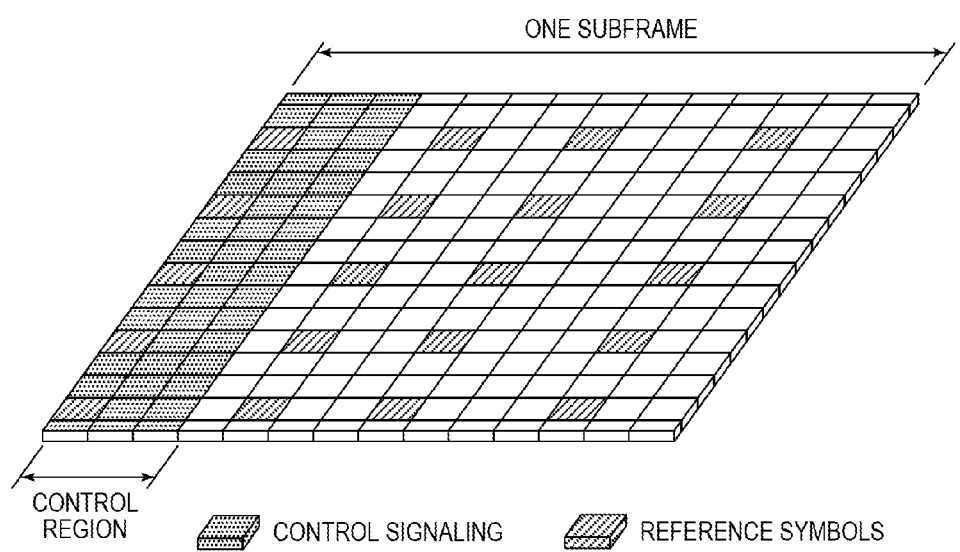
FIG. 3 illustrates an LTE downlink subframe.
Figure 4:
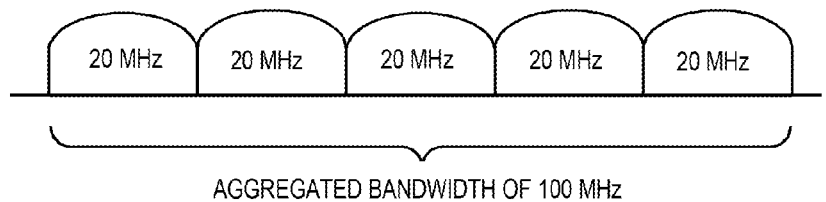
FIG. 4 illustrates an example of carrier aggregation.
Figure 5:
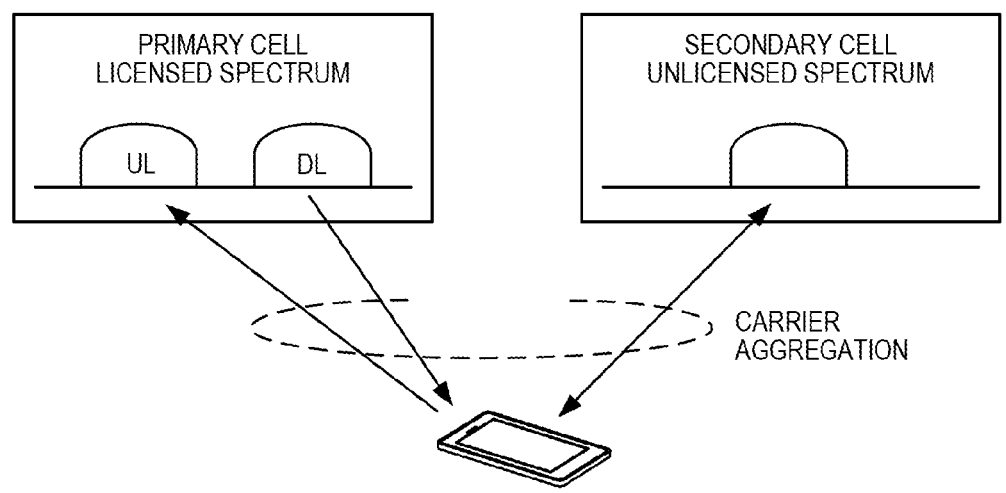
FIG. 5 illustrates an example of license-assisted access (LAA) to unlicensed spectrum using LTE carrier aggregation.
Figure 6:
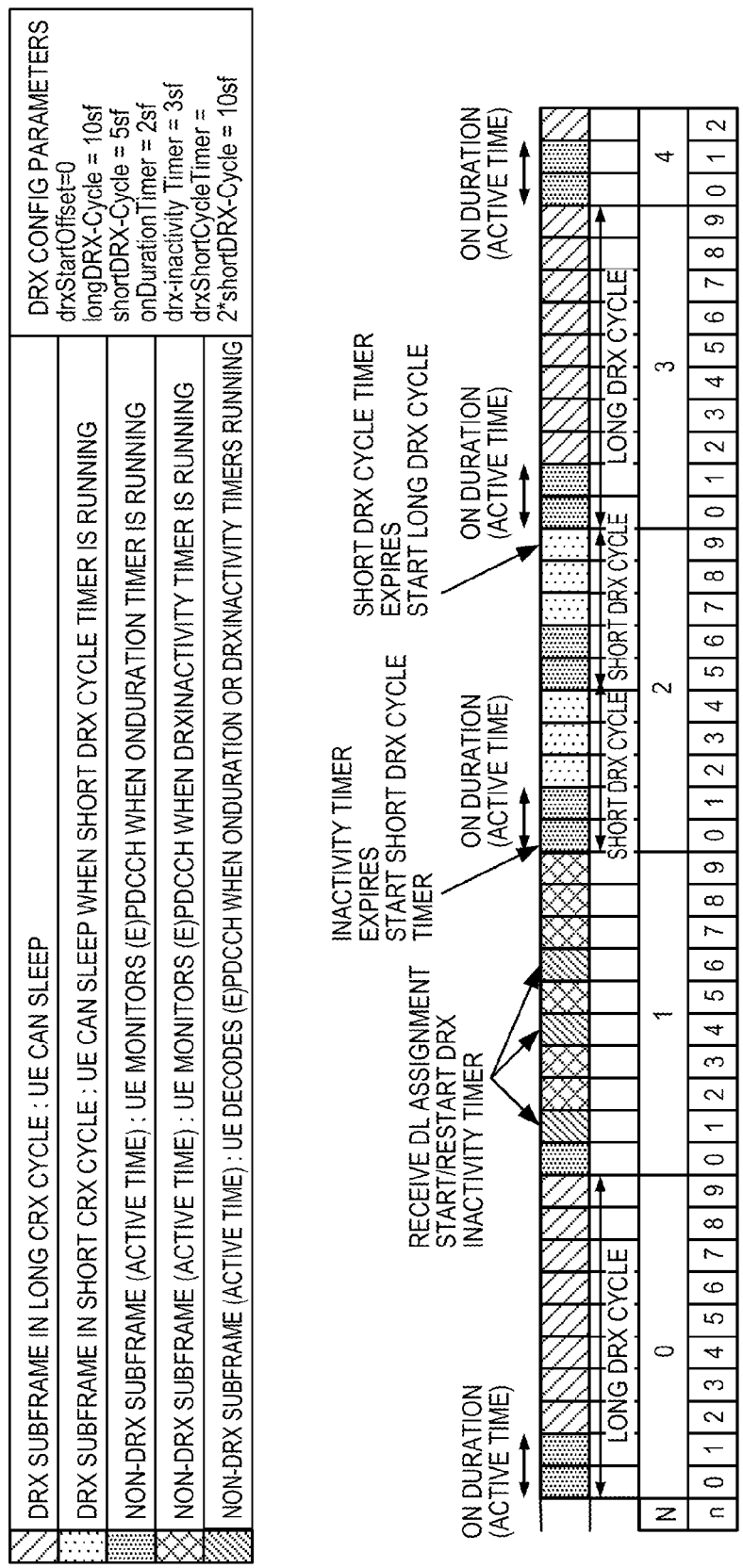
FIG. 6 is an example illustration of DRX timing for a UE configured with both long and short DRX cycles.
Figure 7:
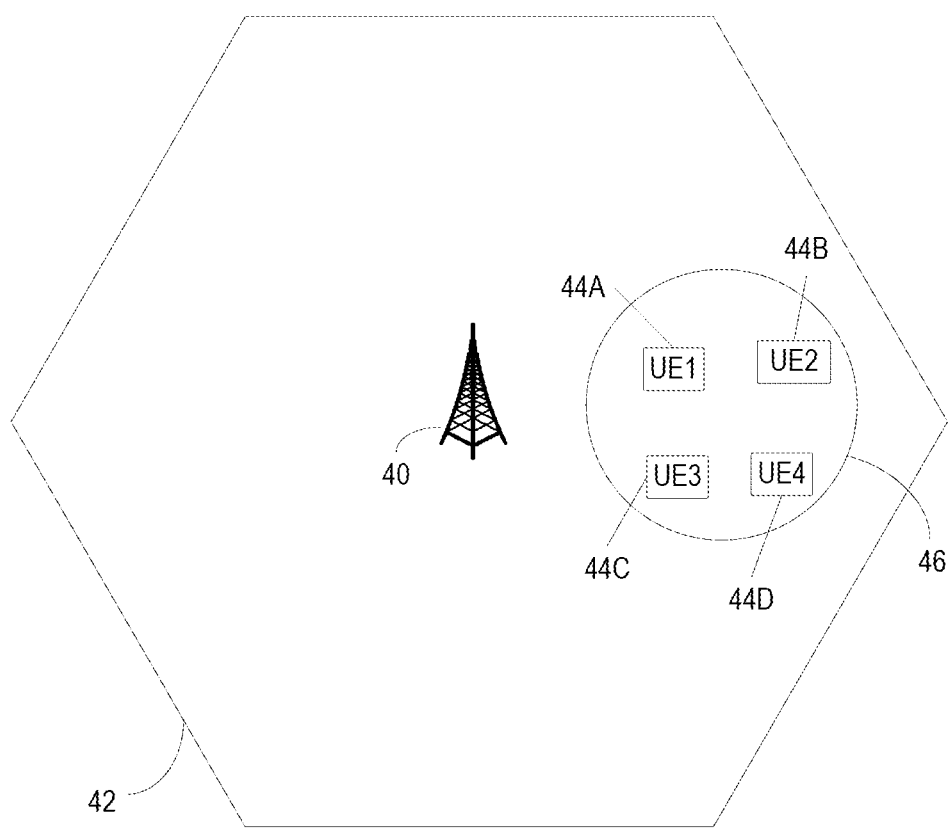
FIG. 7 illustrates an example wireless communication network.

FIG. 7 illustrates an example wireless communication network in which a base station 40 (e.g., a eNodeB) supports a cell 42. A number of UEs 44A-D (also labeled as UE1-UE4) communicate with the base station in the cell 42, and form group 46. FIG. 7 will be used to describe the various embodiments discussed below.

The methods discussed below manage the load on the control channel and improve UE throughput and delay performance by using proper design of the physical layer group signaling. These methods can also improve UE power efficiency.

The physical layer control signaling that is used in this method conveys some common information applicable to a group or some groups of UEs about the transmission from the cell (e.g., group 46 in FIG. 7). It can further include information for each UE in that group or groups, for example, regarding whether there are going to be transmissions specifically for that UE or not. For example, the information could inform a group of UEs about whether the cell is ON or OFF without providing any details, or about whether a UE is going to receive data or not.

Examples of the control physical layer group signaling are using a DCI format on the DL control channel. One specific example of that is the DCI format 1C or DCI format 1A.

In order for the control physical layer group signaling to be identified by its corresponding group, a Radio Network Temporary Identifier (RNTI) specific to that group can be used for example to be scrambled with the CRC of the DCI format in the physical layer group signaling. This RNTI can, for example, be referred to as I-RNTI to represent the group Indicator RNTI. An alternative is that an existing RNTI is reused, such as the RNTI for group power control commands, i.e., TPC-PUSCH-RNTI or TPC-PUCCH-RNTI. This could be performed together with the signaling for those specific RNTI, wherein a bit-map is signaled and corresponding bit(s) assigned to the UE indicates the activity status on the intended cell. A further alternative is that another RNTI is used, for example the SI-RNTI or the P-RNTI together or without a specific bit sequence in the DCI message indicating that this is an indicator RNTI. An example of such an indicator would be an invalid resource block assignment for DCI format 1A, e.g., the resource block assignment field is set to all ones. For the case the remaining bits in the DCI message can indicate which group of UEs the indicator is intended for.

Moreover, in case that the physical layer group signaling includes some information for each UE within a group, the UEs within the group can be identified by different methods. One method for example is to use a bitmap configured by a higher layer understandable for each UE within the group. Another method is to use a function based on C-RNTI that provides differentiations among UEs and enables different UEs to determine if they are specifically addressed or not.

The eNB can transmit the physical layer group signaling periodically or triggered by some event. Examples of the events can be incoming traffic for some UEs or successful access to a channel on an unlicensed carrier where access to the channel is intermittent.

When the UEs are coming out of DRX and start to monitor the cell during the onDuration, by detecting the physical layer group signaling, they can extend their corresponding Active Time. This provides the opportunity for the scheduler at the eNB to distribute the load of the control channel for data scheduling on a longer time interval than the onDuration of the DRX cycle based on the fact that the UEs are going to be monitoring the channel.

In addition, if the eNB assesses, based on some criteria, that some UEs for some time interval are less probable to be scheduled with any data and instead can save power by stopping to monitor the (E)PDCCH, the eNB can include the relevant information in the physical layer group signaling by indicating to each UE whether to expect data or not even though, for example, the eNB is going to transmit some signal. That information helps some UEs within a group of UE to return to DRX if they prefer and hence improve their corresponding power consumption.

In the teaching of these embodiments, we describe the design aspects of the physical layer group signaling from the eNB side and continue by determining the corresponding UE behavior in order to clarify how these methods improve the system performance by managing the load on the control and shared data channel as well as improving UE power consumption.

The Information Included in the Physical Layer Group Signaling (eNB Behavior):

Examples of the information included in the physical layer group signaling are the following:
  A) Whether the serving cell is going to transmit some signal (such as reference signals or other transmissions that are not actual PDSCH transmissions) or not for an upcoming period of time, and whether the serving eNB is going to schedule some data (without indicating to each UE) for an upcoming period of time.
  B) Whether the serving cell is going to transmit some signal or not for an upcoming period of time and whether the serving eNB is going to schedule data for an upcoming period of time, and, for each UE within the group, whether the eNB is going to schedule data for it or not.
  C) The serving cell is going to transmit some signal for an upcoming period of time and whether the serving eNB is going to schedule data (without indicating to each UE) for an upcoming period of time.
  D) The serving cell is going to transmit some signal for an upcoming period of time and whether the serving eNB is going to schedule data for an upcoming period of time and for each UE within the group, whether the eNB is going to schedule data for it or not.

The Timing of the Physical Layer Group Signaling (eNB Behavior):

Examples of transmission timing of the physical layer group signaling include the following:
  A) during the Active Time;
  B) during the onDuration of the DRX cycle; and
  C) during the onDuration of only the Short DRX cycle if it is configured.

Moreover, examples of the time period that the information within the physical layer group signaling corresponds to include:
  A) The time interval starting from the transmission time of the physical layer group signaling and ending at a time configured by higher layers for the time interval that is signaled to the UEs.
  B) The time interval starting from the transmission time of the physical layer group signaling until the transmission time when a new physical layer group signaling is transmitted.

The UE Behavior in Relation to the Physical Layer Group Signaling:

When the UE is configured with DRX, it monitors the group physical layer signaling during the Active Time. In particular, when the UE is coming out of DRX, it starts monitoring the group physical layer signal during the onDuration.

If the UE decodes the physical layer group signaling, depending on the information contained in the physical layer group signaling, it can behave differently. Examples of the UE behaviors are listed in the following:
  A) The following behaviors correspond to the case that an eNB provides the information (A) mentioned above in the physical layer group signaling:

If the UE decodes that there is no upcoming signal from the serving cell, the UE can stop monitoring on that serving cell until the next configured onDuration occasion.

Else if the UE decodes that there is an upcoming signal from the serving cell, the UE starts/restarts its drx-InactivityTimer and monitors the (E)PDCCH.

B) The following behaviors correspond to the case that an eNB provides the information (B) mentioned above in the physical layer group signaling:

If the UE decodes that there is no upcoming signal from the serving cell, the UE can stop monitoring on that serving cell until the next configured onDuration occasion.

Else if the UE decodes that there is an upcoming signal from the serving cell;

if the UE decodes that there is upcoming data for that UE, the UE starts/restarts its drx-InactivityTimer and monitors (E)PDCCH;

otherwise, the UE can stop monitoring on that serving cell until the next configured onDuration occasion.

C) The following behaviors correspond to the case that an eNB provides the information (C) mentioned above in the physical layer group signaling:

If the UE decodes the physical layer group signaling from that serving cell the UE starts/restarts its drx-InactivityTimer and monitors (E)PDCCH.

Otherwise the UE can stop monitoring on that serving cell until the next configured onDuration occasion.

D) The following behaviors correspond to the case that an eNB provides the information (D) mentioned above in the physical layer group signaling:

If the UE decodes the physical layer signal from that serving cell;

if the UE decodes that there is upcoming data for that UE, the UE starts/restarts its drxInactivityTimer monitors (E)PDCCH;

otherwise, the UE can stop monitoring on that serving cell until the next configured onDuration occasion.

Else if the UE fails to decode the physical layer signal from that serving cell, the UE can stop monitoring on that serving cell until the next configured onDuration occasion.

It can be understood as well from the above example that the same DRX configuration can be applied for all serving cells for a given UE. Hence the intended UE behavior for such a case may not be exactly as described above. If, for example, the UE detects a signal that triggers a start/restarts of its drx-InactivityTimer this would apply for all serving cells of the UE. If the UE does not detect any signaling on a specific serving cell during the onDuration, the UE may anyway prolong the onDuration period for that serving cell by a trigger from another serving cell. Further the DRX can also be applied on a single serving cell as more described in the above example, or also extended to a group of serving cells.

As it can be understood from the examples above on the UE behavior, all types of behaviors, i.e., A to D, provide some level of improvement in the control channel load management, especially when the cell transitions between ON and OFF DRX states. Moreover, UE behaviors in examples B and D provide some additional benefit in terms of improving UE power consumption. An example is shown in FIGS. 8A-B.

Figure 8A:
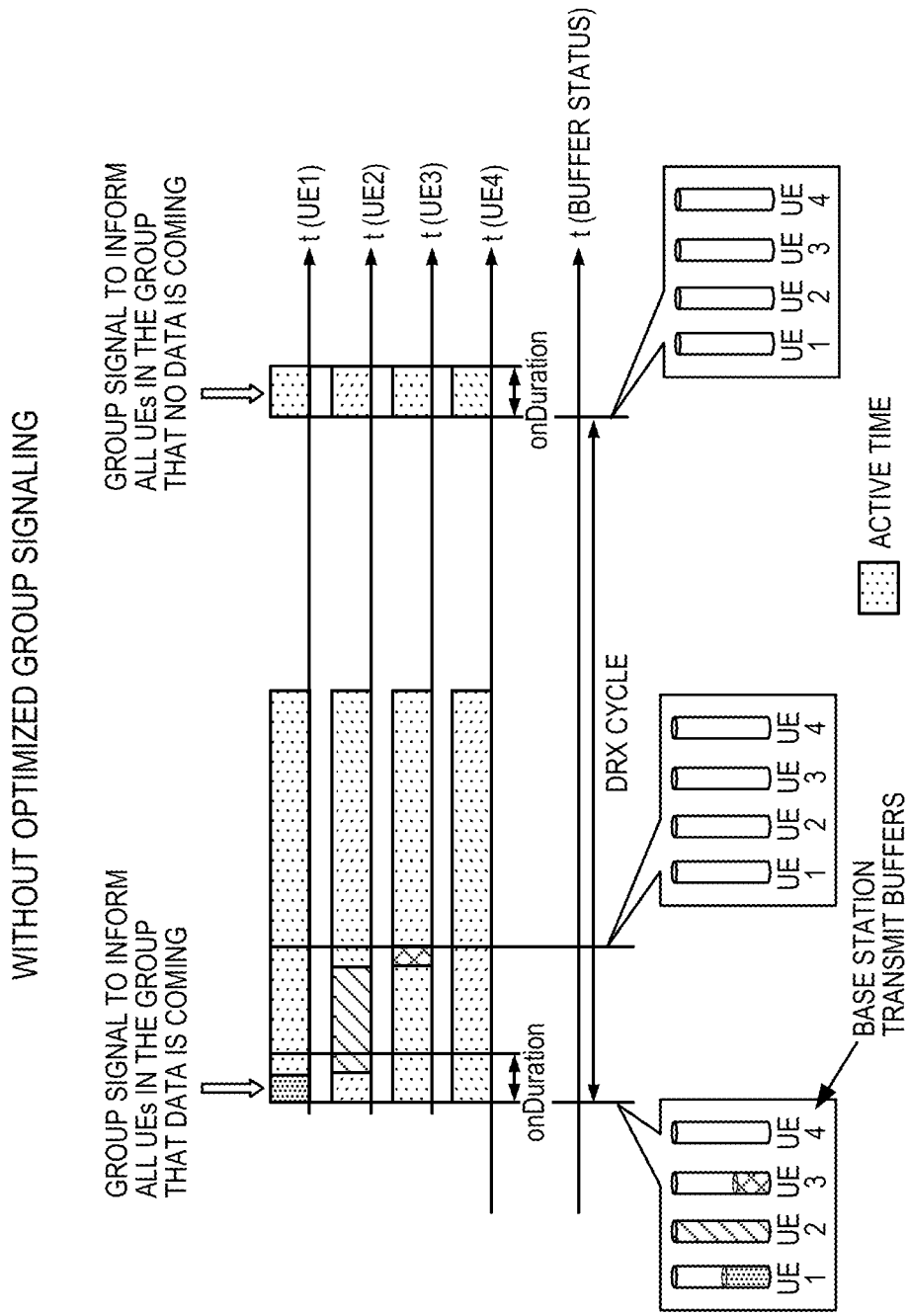

As can be seen in FIGS. 8A-B, the optimization of the group signaling adds information for individual UEs even though the information for each UE is sent in a single group message element.

Figure 9:
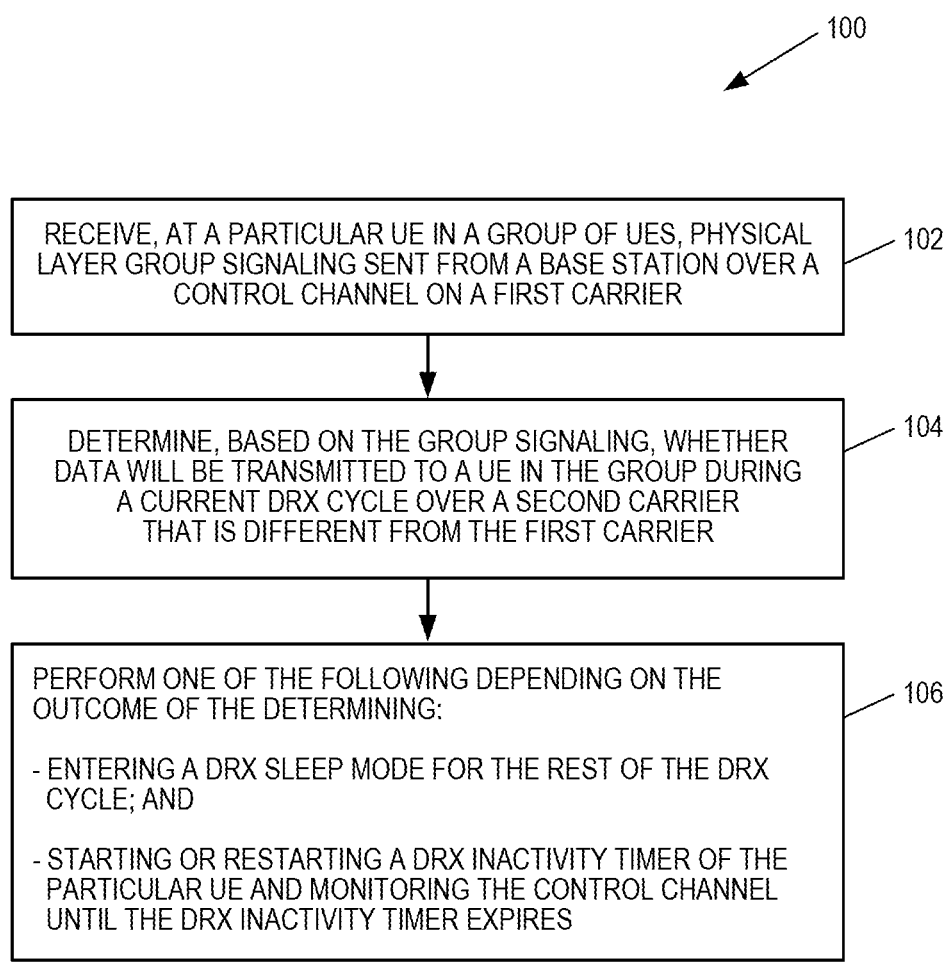
FIG. 9 illustrates an example method implemented by a user equipment.

FIG. 9 illustrates an example method 100 implemented by a particular user equipment (UE) that is part of a group of UEs. The particular UE receives physical layer group signaling sent from a base station over a control channel on a first carrier (block 102), and determines, based on the group signaling, whether data will be transmitted by the base station to a UE in the group during a current DRX cycle over a second carrier that is different from the first carrier (block 104). Depending on the outcome of the determining, the particular UE performs one of the following: entering a DRX sleep mode for the rest of the DRX cycle; and starting or restarting a DRX inactivity timer of the particular UE and monitoring the control channel until the DRX inactivity timer expires (block 106).

Figure 10:
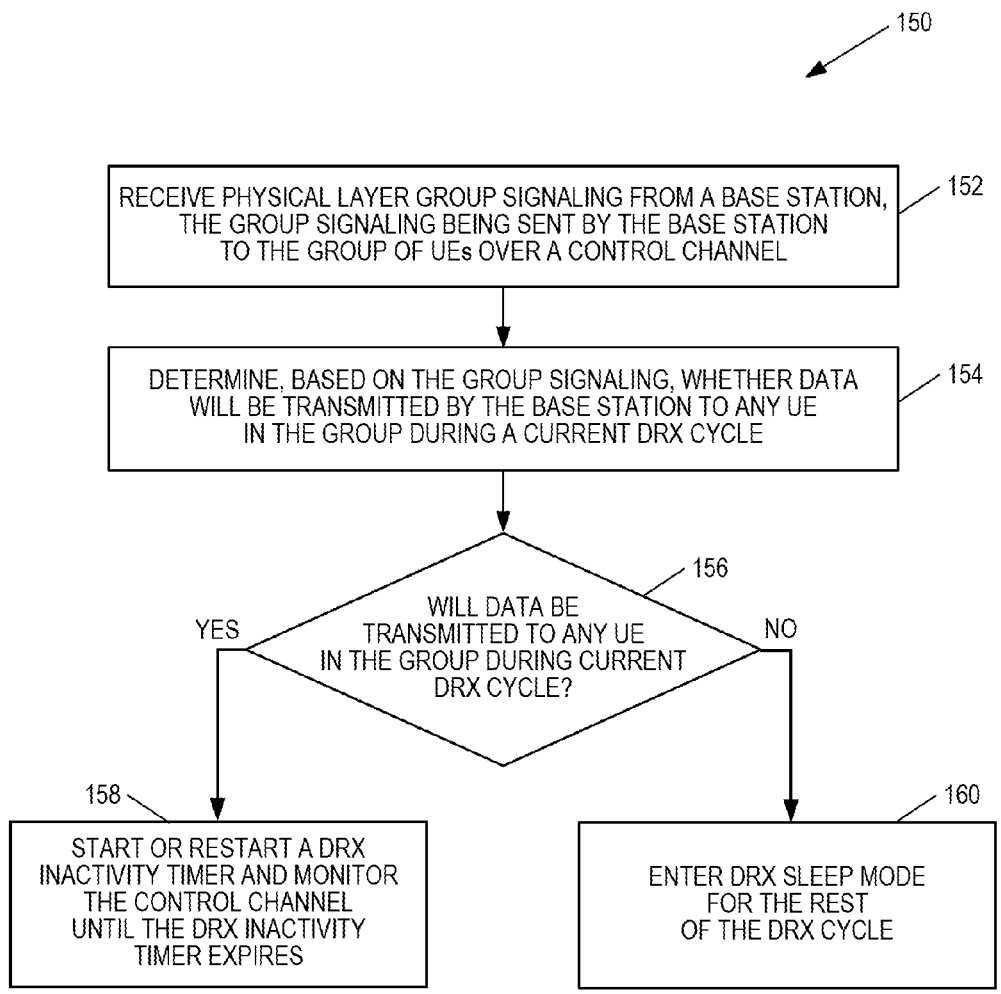
FIG. 10 illustrates an embodiment of the method of FIG. 9.

FIG. 10 illustrates a method 150 that is an embodiment of the method 100 of FIG. 9. The method 150 is implemented by a UE that is part of a group of UEs (e.g., UE1 in group 46 of FIG. 7), each of which is configured to use DRX. The UE receives (block 152) physical layer group signaling from a base station, with the group signaling being sent from the base station to the group of UEs over a control channel (e.g., the PDCCH or EPDCCH). The UE determines (block 154), based on the group signaling, whether data will be transmitted by the base station any UE in the group during a current DRX cycle. If the determining indicates that no data will be transmitted to any UEs in the group during the current DRX cycle (a "no" to block 156)", the UE enters a DRX mode for the rest of the DRX cycle (block 160). If the determining indicates that data will be transmitted to any UE in the group during the current DRX cycle (a "yes" to block 156), the UE starts or restarts a DRX inactivity timer (e.g., drx-InactivityTimer) and monitors the control channel until the DRX inactivity timer expires (block 158). The method 150 could be used according to example (A) above, for example.

Figure 11:
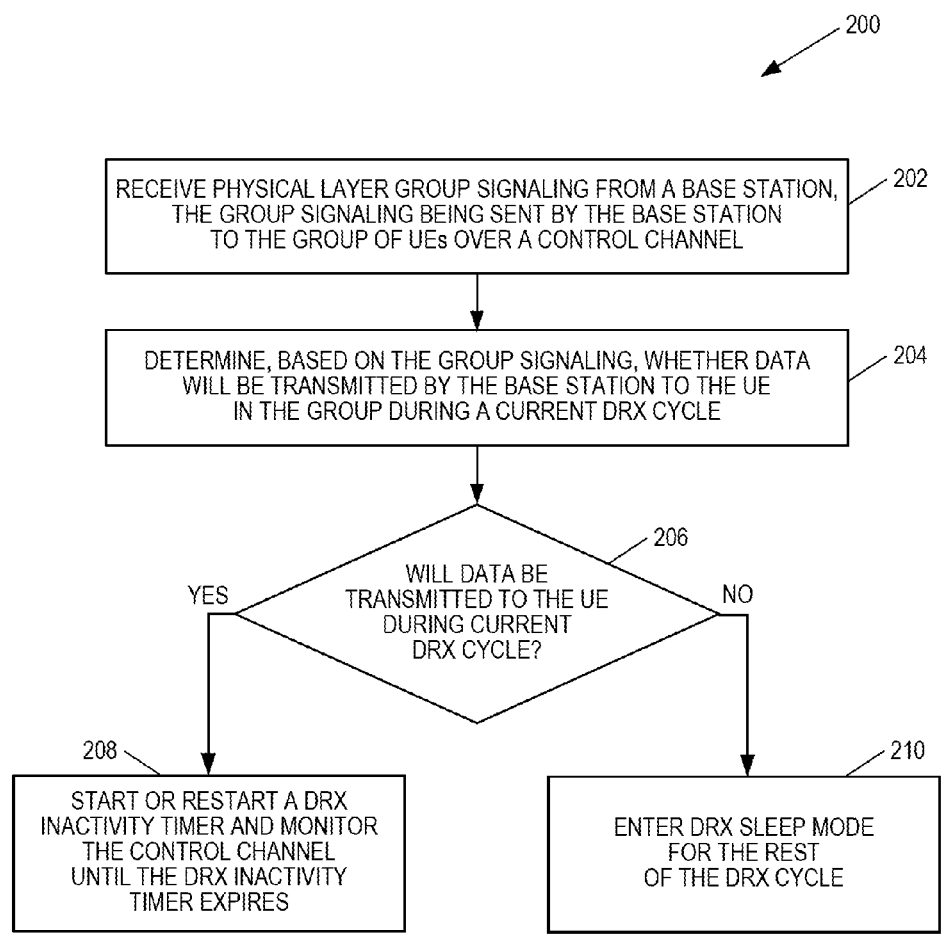
FIG. 11 illustrates another embodiment of the method of FIG. 9.

FIG. 11 illustrates a method 200 that is another embodiment of the method 100 of FIG. 9. The method 200 is implemented by a UE that is part of a group of UEs (e.g., UE1 in group 46 of FIG. 7), each of which is configured to use DRX. The UE receives (block 202) physical layer group signaling from a base station, with the group signaling being sent from the base station to the group of UEs over a control channel (e.g., the PDCCH or EPDCCH). The UE determines (block 204), based on the group signaling, whether data will be transmitted by the base station to the UE during a current DRX cycle. If the determining indicates that no data will be transmitted to the UE during the current DRX cycle (a "no" to block 206), the UE enters a DRX mode for the rest of the DRX cycle. If the determining indicates that data will be transmitted to the UE during the current DRX cycle (a "yes" to block 206), the UE starts or restarts a DRX inactivity timer (e.g., drx-InactivityTimer) and monitors the control channel until the DRX inactivity timer expires (block 208). The method 200 could be used according to example (B) above, for example.

Figure 12:
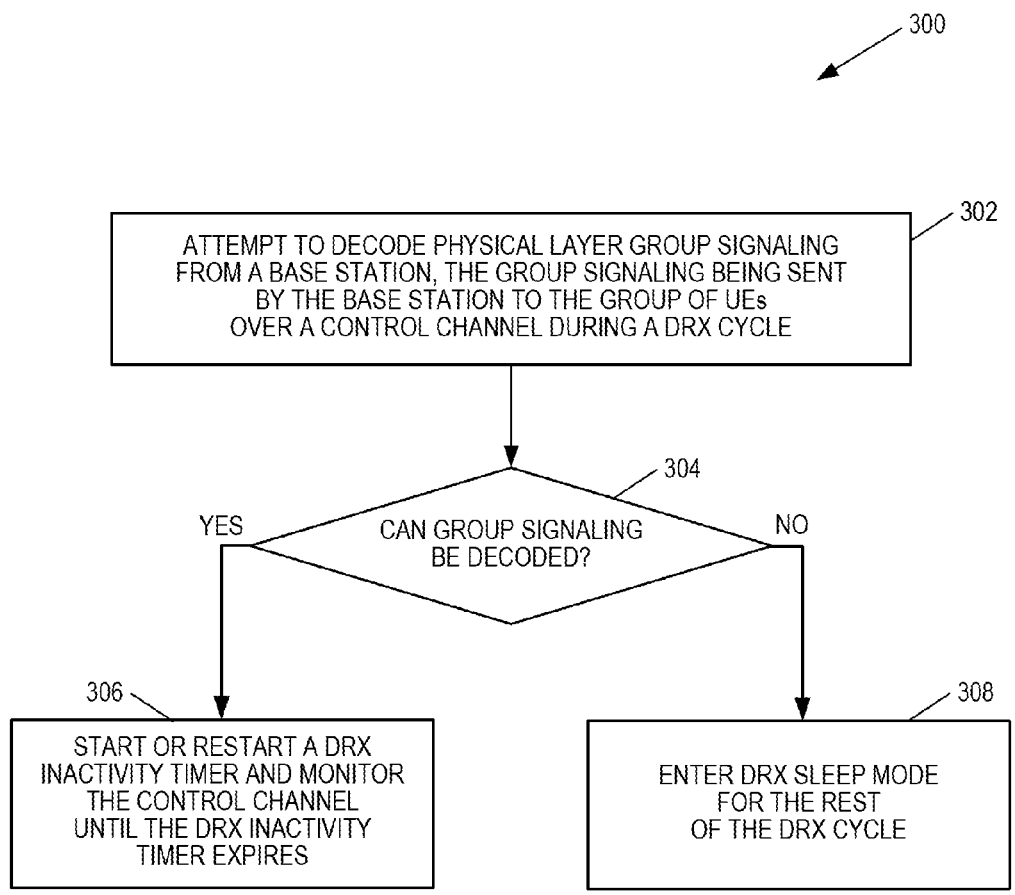
FIG. 12 illustrates another example method implemented by a user equipment.

FIG. 12 illustrates a method 300 implemented by a UE that is part of a group of UEs (e.g., UE1 in group 46 of FIG. 7), each of which is configured to use DRX. The UE attempts to decode physical layer group signaling from a base station, with the group signaling being sent from the base station to the group of UEs over a control channel (e.g., the PDCCH or EPDCCH) during a DRX cycle (block 302). If the group signaling cannot be decoded (a "no" to block 304), the UE enters a DRX mode for the rest of the DRX cycle (block 308). If the group signaling is successfully decoded (a "yes" to block 304), the UE starts or restarts a DRX inactivity timer (e.g., drx-InactivityTimer) and monitors the control channel until the DRX inactivity timer expires. The method 300 could be used according to example (C) above, for example.

Figure 13:
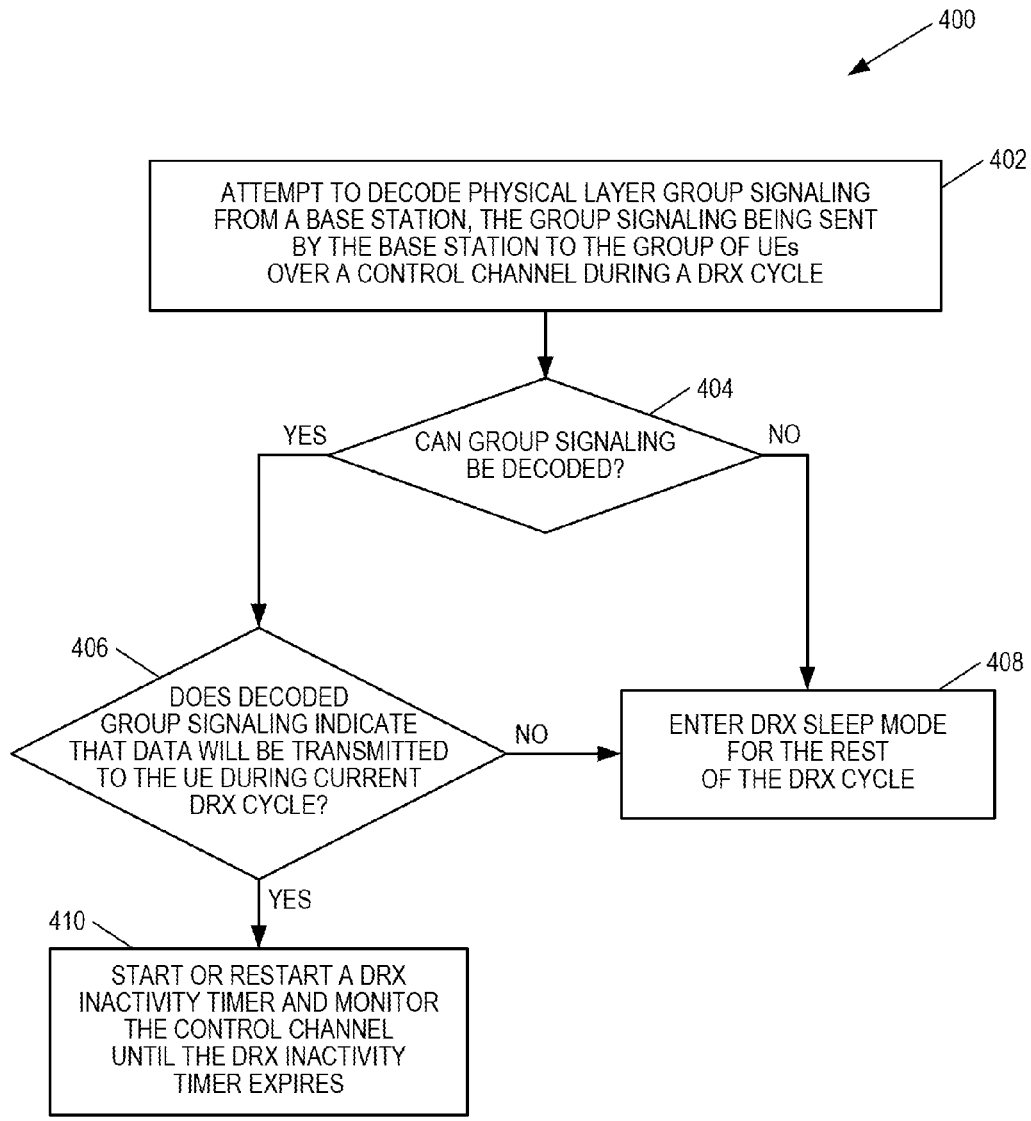
FIG. 13 illustrates another embodiment of the method of FIG. 9, that includes aspects of the method of FIG. 12.

FIG. 13 illustrates a method 400 that is another embodiment of the method of FIG. 9, and that includes aspects of the method 300 of FIG. 12. The method 400 is implemented by a UE that is part of a group of UEs (e.g., UE1 in group 46 of FIG. 7), each of which is configured to use DRX. The UE attempts to decode physical layer group signaling from a base station, with the group signaling being sent by the base station to the group of UEs over a control channel (e.g., the PDCCH or EPDCCH) during a DRX cycle (block 402). If the group signaling cannot be decoded (a "no" to block 404), the UE enters a DRX mode for the rest of the DRX cycle (block 408). If the group signaling is successfully decoded and indicates that no data will be transmitted to the UE during the current DRX cycle (a "no" to block 406), the UE enters the DRX mode for the rest of the DRX cycle (block 408). If the group signaling is successfully decoded and indicates that data will be transmitted to the UE during the current DRX cycle (a "yes" to blocks 404 and 406), the UE starts or restarts a DRX inactivity timer (e.g., drx-InactivityTimer) and monitors the control channel until the DRX inactivity timer expires (block 410). The method 400 could be used according to example (D) above, for example.

Figure 14:
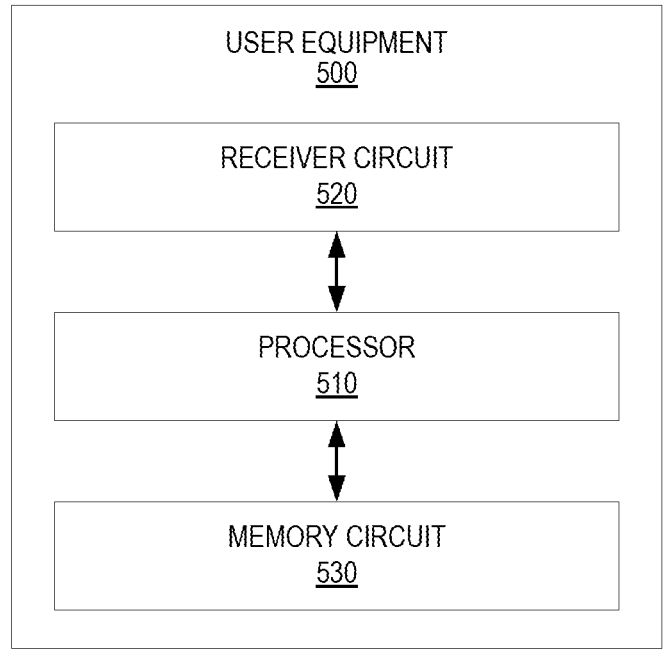
FIG. 14 illustrates an example user equipment.
Figure 15:
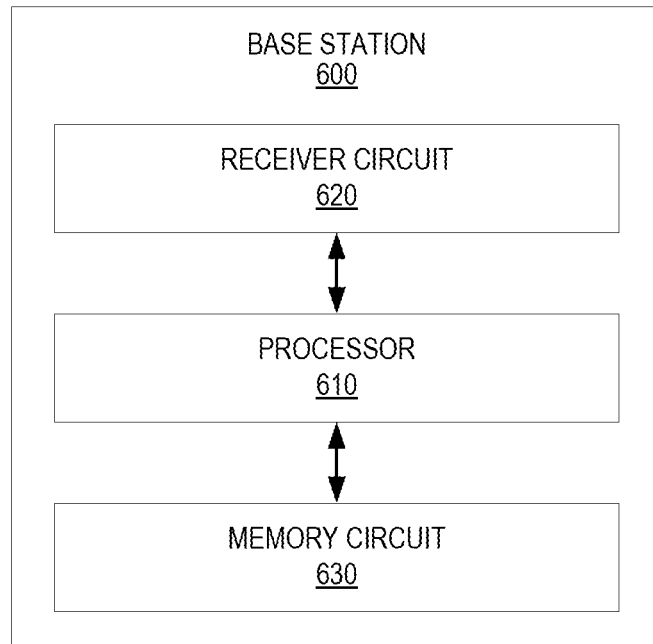
FIG. 15 illustrates an example base station.

FIG. 14 illustrates a particular UE 500 configured be part of a group of UEs that use DRX (e.g., the group 46 in FIG. 7). The particular UE 500 includes one or more processing circuits (shown as "processor" 510), a receiver circuit 520, and a memory circuit 530. The one or more processing circuits 510 may include one or more microprocessors, microcontrollers, digital signal processors, or the like, for example. The receiver circuit 520 is configured to receive physical layer group signaling sent from a base station, with the group signaling being sent from the base station to the group of UEs over a control channel (e.g., the PDCCH or EPDCCH). The group signaling may be sent on a first carrier, for example. The memory circuit 530 is configured to track one or more DRX timers (e.g., a DRX inactivity timer). The one or more processing circuits are configured to determine, based on the group signaling, whether data will be transmitted by the base station to a UE in the group during a current DRX cycle over a second carrier that is different from the first carrier. The one or more processing circuits are further configured to perform one of the following depending on the outcome of the determining: enter a DRX sleep mode for the rest of the DRX cycle; and start or restart a DRX inactivity timer of the particular UE and monitor the control channel until the DRX inactivity timer expires.

The processing circuits may be configured to implement any combination of the methods 100-400 discussed above.

Thus, in one embodiment, the one or more processing circuits (510) are configured to:
  determine, based on the group signaling, whether data will be transmitted by the base station to any UE in the group during a current DRX cycle;
  if the determining indicates that no data will be transmitted to any UEs in the group during the current DRX cycle, cause the particular UE to enter a DRX mode for the rest of the DRX cycle; and
  if the determining indicates that data will be transmitted to any UE in the group during the current DRX cycle, start or restart a DRX inactivity timer and monitor the control channel via the receiver circuit until the DRX inactivity timer expires.

In the same or another embodiment, the one or more processing circuits (510) are configured to:
  determine, based on the group signaling, whether data will be transmitted by the base station to the particular UE 500 during a current DRX cycle;
  if the determining indicates that no data will be transmitted to the particular UE 500 during the current DRX cycle, cause the particular UE 500 to enter a DRX mode for the rest of the DRX cycle; and
  if the determining indicates that data will be transmitted to the particular UE 500 during the current DRX cycle, start or restart a DRX inactivity timer and monitor the control channel via the receiver circuit until the DRX inactivity timer expires.

In the same or another embodiment, the one or more processing circuits (510) are configured to:
  attempt to decode physical layer group signaling received from a base station (via receiver circuit 520), with the group signaling being sent from the base station to the group of UEs over a control channel during a DRX cycle;
  if the group signaling cannot be decoded, cause the particular UE 500 to enter a DRX mode for the rest of the DRX cycle; and
  if the group signaling is successfully decoded, start or restart a DRX inactivity timer and monitor the control channel via the receiver circuit until the DRX inactivity timer expires.

In the same or another embodiment, the one or more processing circuits (510) are configured to:
  attempt to decode physical layer group signaling received from a base station (via receiver circuit 520), the group signaling being sent by the base station to the group of UEs over a control channel during a DRX cycle;
  if the group signaling cannot be decoded, cause the particular UE 500 to enter a DRX mode for the rest of the DRX cycle;
  if the group signaling is successfully decoded and indicates that no data will be transmitted to the particular UE 500 during the current DRX cycle, cause the particular UE 500 to enter the DRX mode for the rest of the DRX cycle; and
  if the group signaling is successfully decoded and indicates that data will be transmitted to the particular UE 500 during the current DRX cycle, start or restart a DRX inactivity timer and monitor the control channel via the receiver circuit until the DRX inactivity timer expires.

FIG. 154 illustrates a base station 600 configured to transmit group signaling that indicates which UEs in a group (e.g., group 46) can expect to receive data transmissions during a given DRX cycle. This may be performed in connection with any combination of the methods 100, 200, 300, and 400.

In this regard, the base station 600 includes one or more processing circuits (shown as "processor" 610) configured to determine which UEs are to receive a transmission during a given DRX cycle, and a transmission circuit 620 configured to transmit physical layer group signaling. The processor 610 may include one or more microprocessors, microcontrollers, digital signal processors, or the like, for example.

Some non-limiting advantages of the techniques described above include increased system throughput performance and UE power saving can be achieved by optimizing the physical layer group signaling design.

Thus, the foregoing description and the accompanying drawings represent non-limiting examples of the methods and apparatus taught herein. As such, the present disclosure is not limited by the foregoing description and accompanying drawings.

ABBREVIATIONS

CQI CHANNEL-QUALITY INDICATOR
CSI CHANNEL-STATE INFORMATION
CSI-IM CHANNEL-STATE INFORMATION-INTERFERENCE MEASUREMENT
CSI-RS CHANNEL-STATE INFORMATION-REFERENCE SIGNAL
DL DOWNLINK
DMRS DEMODULATION REFERENCE SIGNALS
ENB EVOLVED NODEB, BASE STATION
PMI PRECODING MATRIX INDICATOR
RI RANK INDICATOR
TTI TRANSMISSION-TIME INTERVAL
UE USER EQUIPMENT
UL UPLINK
LA LICENSE ASSISTED
LAA LICENSE ASSISTED ACCESS
DRS DISCOVERY REFERENCE SIGNAL
QCL QUASI-CO-LOCATION
PQI PDSCH RE MAPPING AND QUASI-CO-LOCATION INDICATOR
LBT LISTEN-BEFORE-TALK
EPDCCH ENHANCED PHYSICAL DOWNLINK CONTROL CHANNEL
PDSCH PHYSICAL DOWNLINK SHARED CHANNEL
DRX DISCONTINUOUS RECEPTION
WCDMA WIDEBAND CODE DIVISION MULTIPLE ACCESS
HSDPA HIGH SPEED DOWNLINK PACKET ACCESS
WiMax WORLDWIDE INTEROPERABILITY FOR MICROWAVE ACCESS)
WLAN WIRELESS LOCAL AREA NETWORK
GSM GLOBAL SYSTEM FOR MOBILE COMMUNICATIONS
GERAN GSM EDGE (ENHANCED DATA RATES FOR GSM EVOLUTION) RADIO ACCESS NETWORK

The present disclosure may, of course, be carried out in other ways than those specifically set forth herein without departing from essential characteristics of the present disclosure. The present embodiments are to be considered in all respects as illustrative and not restrictive, and all changes coming within the meaning and equivalency range of the appended claims are intended to be embraced therein.

What is claimed is:

1. A method implemented by a particular user equipment (UE) that is part of a group of UEs, the method characterized by:
receiving physical layer group signaling sent from a base station over a control channel on a first carrier;
determining, based on the group signaling, whether data will be transmitted by the base station to a UE in the group during a current discontinuous reception (DRX) cycle over a second carrier that is different from the first carrier; and
based on the determining, entering a DRX sleep mode for the rest of the DRX cycle at an earlier time than is configured for the DRX cycle.

2. The method of claim 1,
wherein said determining is characterized by determining whether data will be transmitted to any UE in the group during the current DRX cycle over the second carrier; and
wherein said entering a DRX sleep mode for the rest of the DRX cycle is performed if the determining indicates that data will not be transmitted to any UE in the group during the current DRX cycle over the second carrier.

3. The method of claim 1,
wherein said determining is characterized by determining whether data will be transmitted to the particular UE during the current DRX cycle over the second carrier; and
wherein said entering a DRX sleep mode for the rest of the DRX cycle is performed if the determining indicates that data will be transmitted to the particular UE during the current DRX cycle over the second carrier.

4. The method of claim 3, wherein said determining whether data will be transmitted to the particular UE during the current DRX cycle over the second carrier is performed based on a bitmap.

5. The method of claim 1, wherein said entering a DRX sleep mode for the rest of the DRX cycle is performed if the particular UE cannot decode the physical layer group signaling.

6. The method of claim 1, wherein the group signaling identifies the group of UEs through use of a common Radio Network Temporary Identifier (RNTI).

7. The method of claim 1, wherein one of the first and second carriers is part of a licensed spectrum, and another of the first and second carriers is part of an unlicensed spectrum.

8. The method of claim 7, wherein the first carrier is part of the licensed spectrum, and the second carrier is part of the unlicensed spectrum.

9. The method of claim 1,
wherein the first carrier is a Primary Cell (PCell), and the second carrier is a Secondary Cell (SCell); and
wherein the particular UE is configured to perform carrier aggregation of the first and second carriers.

10. A particular user equipment (UE) that is configured to be part of a group of UEs, the particular UE characterized by:
a receiver circuit configured to receive physical layer group signaling sent from a base station over a control channel on a first carrier; and
one or more processing circuits configured to:
determine, based on the group signaling, whether data will be transmitted by the base station to a UE in the group during a current discontinuous reception (DRX) cycle over a second carrier that is different from the first carrier; and
based on the determination, enter a DRX sleep mode for the rest of the DRX cycle at an earlier time than is configured for the DRX cycle.

11. The user equipment of claim 10,
wherein the determination comprises a determination of whether data will be transmitted to any UE in the group during the current DRX cycle over the second carrier;
wherein the one or more processing circuits are configured to enter the DRX sleep mode for the rest of the DRX cycle if the determination indicates that data will not be transmitted to any UE in the group during the current DRX cycle over the second carrier; and wherein the one or more processing circuits are configured to start or restart a DRX inactivity timer of the particular UE and monitor the control channel until the DRX inactivity timer expires if the determination indicates that data will be transmitted to any UE in the group during the current DRX cycle over the second carrier.

12. The user equipment of claim 10,
wherein the determination comprises a determination of whether data will be transmitted to the particular UE during the current DRX cycle over the second carrier;
wherein the one or more processing circuits are configured to enter the DRX sleep mode for the rest of the DRX cycle if the determining indicates that data will not be transmitted to the particular UE during the current DRX cycle over the second carrier; and
wherein the one or more processing circuits are configured to start or restart a DRX inactivity timer of the particular UE and monitor the control channel until the DRX inactivity timer expires if the determining indicates that data will be transmitted to the particular UE during the current DRX cycle over the second carrier.

13. The user equipment of claim 12, wherein the determination is performed based on a bitmap.

14. The user equipment of claim 10, wherein the one or more processing circuits are configured to enter the DRX sleep mode for the rest of the DRX cycle if the particular UE cannot decode the physical layer group signaling.

15. The user equipment of claim 10, wherein the group signaling identifies the group of UEs through use of a common Radio Network Temporary Identifier (RNTI).

16. The user equipment of claim 10, wherein one of the first and second carriers is part of a licensed spectrum, and another of the first and second carriers is part of an unlicensed spectrum.

17. The user equipment of claim 16, wherein the first carrier is part of the licensed spectrum, and the second carrier is part of the unlicensed spectrum.

18. The user equipment of claim 10,
wherein the first carrier is a Primary Cell (PCell), and the second carrier is a Secondary Cell (SCell); and
wherein the particular UE is configured to perform carrier aggregation of the first and second carriers.

19. The method of claim 1, wherein the method comprises:
determining whether data will be transmitted by the base station to a UE in the group during a second discontinuous reception cycle over a second carrier that is different from the first carrier; and
based on the determining starting or restarting a DRX inactivity timer of the particular UE and monitoring the control channel during the second discontinuous reception cycle until the DRX inactivity timer expires.

20. The method of claim 1, wherein the sleep mode of the DRX cycle of the particular user equipment is independent of the sleep modes of the DRX cycle of other UEs in the group of UEs.

* * * * *